United States Patent
Kuwahara et al.

(10) Patent No.: US 7,797,992 B2
(45) Date of Patent: Sep. 21, 2010

(54) CONTROL APPARATUS FOR A SOURCE OF ROTATIONAL DRIVE FORCE

(75) Inventors: Seiji Kuwahara, Toyota (JP); Masato Kaigawa, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 328 days.

(21) Appl. No.: 12/113,694

(22) Filed: May 1, 2008

(65) Prior Publication Data
US 2008/0281502 A1 Nov. 13, 2008

(30) Foreign Application Priority Data
May 11, 2007 (JP) .............................. 2007-126452

(51) Int. Cl.
*G01M 15/04* (2006.01)
(52) U.S. Cl. .................................................. 73/114.25
(58) Field of Classification Search .............. 73/114.04, 73/114.24, 114.25
See application file for complete search history.

(56) References Cited

U.S. PATENT DOCUMENTS

| 5,365,903 A | | 11/1994 | Watanabe | |
|---|---|---|---|---|
| 6,157,878 A | * | 12/2000 | Suzuki | 701/29 |
| 2005/0216162 A1 | * | 9/2005 | Suzuki et al. | 701/70 |
| 2007/0150158 A1 | * | 6/2007 | Inoue et al. | 701/93 |
| 2007/0208485 A1 | * | 9/2007 | Yamamura et al. | 701/93 |
| 2008/0093141 A1 | * | 4/2008 | Muta et al. | 180/65.4 |
| 2008/0154472 A1 | * | 6/2008 | Okuda et al. | 701/93 |
| 2009/0043468 A1 | * | 2/2009 | Kondo et al. | 701/61 |

FOREIGN PATENT DOCUMENTS

| DE | 43 27 912 C1 | 9/1994 |
|---|---|---|
| DE | 198 06 393 A1 | 8/1999 |
| JP | 2003-120349 | 4/2003 |
| JP | 2003-170759 | 6/2003 |

* cited by examiner

*Primary Examiner*—Eric S McCall
(74) *Attorney, Agent, or Firm*—Oblon, Spivak, McClelland, Maier & Neustadt, L.L.P.

(57) ABSTRACT

A control apparatus for controlling a source of rotational drive force based on a target rotational speed. The control apparatus includes a target model rotational speed calculation section, an actual rotational speed detection section, and a target rotational speed adjustment section. The target model rotational speed calculation section calculates a rotational speed corresponding to a target drive force of the source as a target model rotational speed. The actual rotational speed detection section detects an actual of the source. The target rotational speed adjustment section sets the target rotational speed by correcting a value of the target model rotational speed calculated by the target model rotational speed calculation section to gradually approach the actual rotational speed detected by the actual rotational speed detection section. Accordingly, hunting of the engine during control is prevented and the deviation between the actual rotational speed and the target rotational speed is reduced or prevented.

15 Claims, 8 Drawing Sheets

CONTROL APPARATUS FOR A SOURCE OF ROTATIONAL DRIVE FORCE

CROSS-REFERENCE TO RELATED APPLICATIONS

The entire disclosure of Japanese Patent Application No. 2007-126452, filed on May 11, 2007, is expressly incorporated by reference herein.

FIELD OF THE INVENTION

The present invention relates to a control apparatus for controlling the source of a rotational drive force based on target rotational speed.

BACKGROUND

In the field of internal combustion engines for vehicles, for example, there has been proposed an apparatus for controlling an internal combustion engine in such a manner as to achieve a torque output and a vehicle acceleration corresponding to an accelerator operation of the driver as described in Japanese Unexamined Patent Publication Nos. 2003-120349 and 2003-170759.

In the patent documents cited above, in order to calculate a control amount for achieving a target drive force such as a target torque, actual engine speed is used as one of parameters. However, even if actual torque approaches or coincides with target torque in accordance with this control, a comparatively long dead time is required until the engine speed actually reaches a level corresponding to the target torque. Accordingly, if a control amount is calculated based on the actual engine speed, hunting of the engine may be generated during the driving of the internal combustion engine.

In order to prevent the hunting from occurring, it is possible to determine target rotational speed corresponding to a target drive force of an internal combustion engine drive system by using a model as a preset internal combustion engine model or an output transmission model and determine a control amount based on the target rotational speed. However, such a model represents a standard or average relation and does not necessarily match an actual individual internal combustion engine or output transmission system with high precision. Accordingly, deviation may occur between the engine speed actually reached and the target rotational speed at steady state, which can reduce the precision of various controls.

SUMMARY OF THE INVENTION

An object of the present invention is to prevent hunting during control in a control apparatus for a source of a rotational drive force, and to reduce or prevent deviation between actual rotational speed and target rotational speed.

In one aspect, a control apparatus for controlling a source of a rotational drive force based on a target rotational speed is provided. The control apparatus comprises a target model rotational speed calculation section, an actual rotational speed detection section, and a target rotational speed adjustment section. The target model rotational speed calculation section operates to calculate a rotational speed corresponding to a target drive force of the source as a target model rotational speed. The actual rotational speed detection section operates to detects an actual rotational speed of the source. The target rotational speed adjustment section operates to set the target rotational speed by correcting a value of the target model rotational speed calculated by the target model rotational speed calculation section to gradually approach the actual rotational speed detected by the actual rotational speed detection section.

In the second aspect, a control apparatus for controlling a source of a rotational drive force is provided. The control apparatus comprises a target rotational speed calculation section, a target drive force setting section, and a control amount calculation section. The target rotational speed calculation section operates to calculates a target rotational speed of the source of the rotational drive force. The target drive force setting section operates to set a target drive force generated by the source. The control amount calculation section operates to calculate a control amount of the source based on the target rotational speed calculated by the target rotational speed calculation section and the target drive force set by the target drive force setting section, by using a predetermined rotational drive force model for the source. The target rotational speed calculation section includes a target model rotational speed calculation section, an actual rotational speed detection section, and a target rotational speed adjustment section. The target model rotational speed calculation section operates to calculate a rotational speed corresponding to the target drive force as a target model rotational speed based on the target drive force set by the target drive force setting section, by using a predetermined rotational drive force source output transmission model of the source. The actual rotational speed detection section operates to detect an actual rotational speed of the source. The target rotational speed adjustment section operates to set the target rotational speed by correcting a value of the target model rotational speed calculated by the target model rotational speed calculation section to gradually approach the actual rotational speed detected by the actual rotational speed detection section.

DETAILED DESCRIPTION OF PREFERRED EMBODIMENTS

Figure 1:
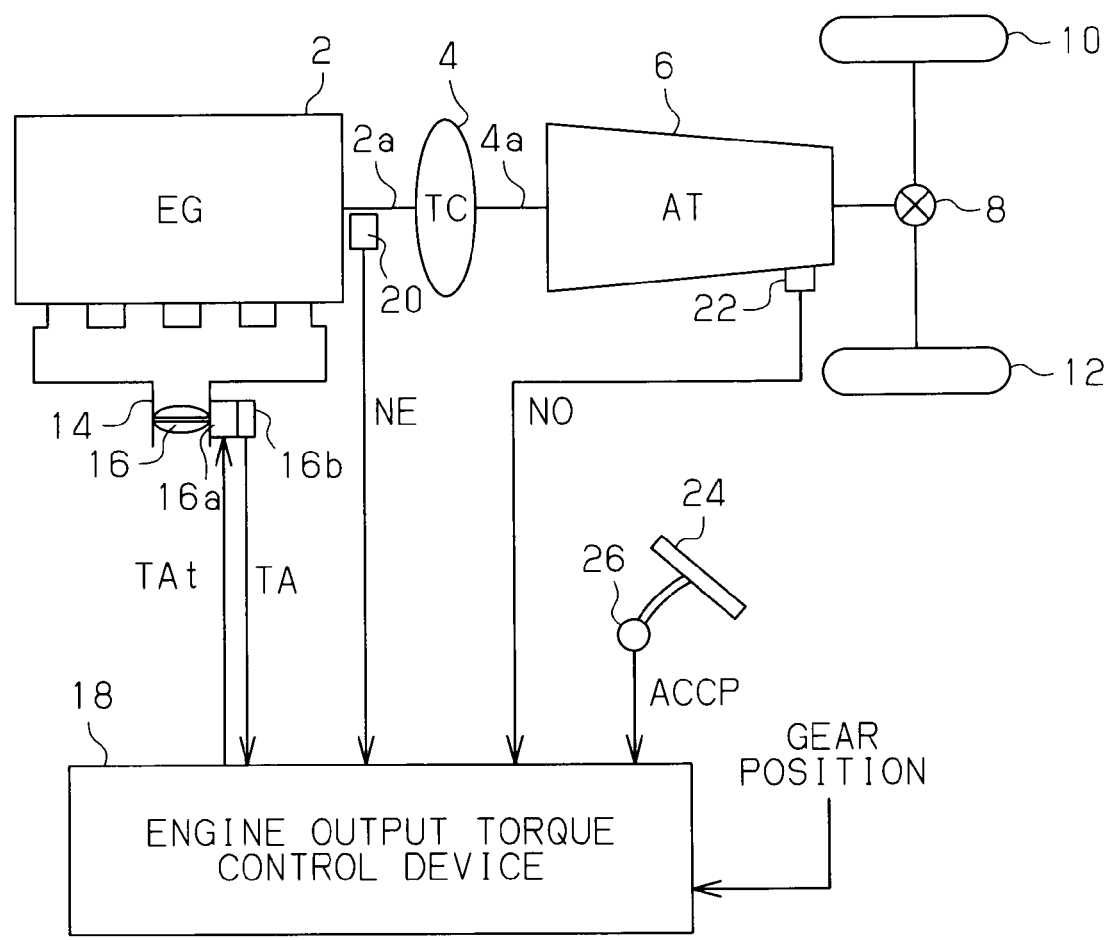
FIG. 1 is a block diagram of a source of rotational drive force, a control apparatus for the source of the rotational drive force, and an output transmission system for the rotational drive force from the source in accordance with a first embodiment.

FIG. 1 shows a block diagram of a source of rotational drive force, a control apparatus for the source of the rotational drive force, and an output transmission system for rotational drive force from the source in accordance with a first embodiment of the present invention. In this drive system, rotational drive force output from a gasoline engine 2, which serves as a source of rotational drive force for a vehicle, is transmitted to drive wheels 10 and 12 via a torque converter 4, an automatic transmission 6 and a differential gear 8.

A throttle valve 16 is provided in an air intake path 14 of the gasoline engine 2. A throttle opening degree TA of the throttle valve 16 can be adjusted by a drive motor 16a. The throttle opening degree TA is detected by a throttle opening degree sensor 16b and is sent to an engine output torque control device 18, which serves as the control apparatus for the source of rotational drive force.

The engine output torque control device 18 receives a signal from an engine speed sensor 20 and an output rotational speed sensor 22 in addition to the throttle opening degree TA. The engine speed sensor 20 detects an actual rotational speed NE (i.e., rotational rate) corresponding to an actual rotational speed of a crank shaft of the gasoline engine 2. The output rotational speed sensor 22 detects an output side rotational speed NO (i.e., rotational rate) of the automatic transmission 6. Further, the engine output torque control device 18 receives a detection signal from an accelerator operation amount sensor 26 and a shift signal representing a gear position from a transmission control apparatus controlling a transmission state of the automatic transmission 6. The accelerator operation amount sensor 26 detects an accelerator operation amount ACCP corresponding to an operation amount of an accelerator pedal 24 operated by a driver. The engine output torque control device 18 executes a computation based on the above signals and various data to calculate a target throttle opening degree Tat and controls the driving motor 16a based on the target throttle opening degree Tat to adjust the output of the rotational drive force of the gasoline engine 2.

Figure 2:
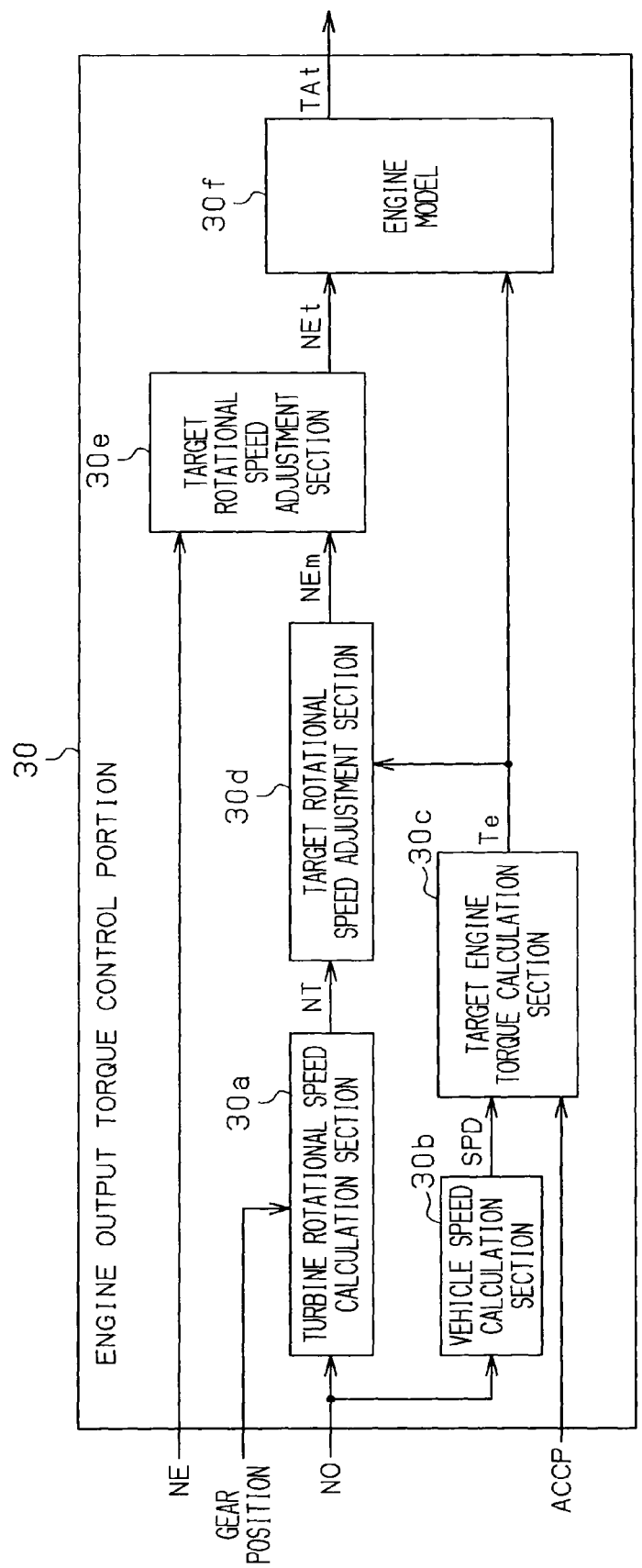
FIG. 2 is a control block diagram illustrating an engine output torque controlling portion.

FIG. 2 illustrates a control block diagram of an engine output torque control portion 30 for controlling the rotational drive force, or the torque output in this case, within the engine output torque control device 18. The engine output torque control portion 30 includes a turbine rotational speed calculation section 30a, a vehicle speed calculation section 30b, a target engine torque calculation section 30c, a torque converter model 30d, a target rotational speed adjustment section 30e, and an engine model 30f.

The turbine rotational speed calculation section 30a calculates a turbine rotational speed NT corresponding to a rotational speed of a turbine shaft 4a of the torque converter 4, based on the gear position and the output side rotational speed NO of the automatic transmission 6. The vehicle speed calculation section 30b calculates a vehicle speed SPD based on the output side rotational speed NO and a differential gear ratio. In this case, the vehicle speed SPD may be a value which is calculated by another vehicle control system independently. The target engine torque calculation section 30c calculates a target engine torque Te based on the vehicle speed SPD and the accelerator operation amount ACCP. The torque converter model 30d is used for calculating a target model rotational speed NEm of the gasoline engine 2 based on the turbine rotational speed NT and the target engine torque Te. The target rotational speed adjustment section 30e is structured such as to calculate a target rotational speed NEt based on the actual rotational speed NE and the target model rotational speed NEm. The engine model 30f is used for calculating a corresponding target throttle opening degree TAt based on the target rotational speed NEt and the target engine torque Te. In this embodiment, a map MAPtat (FIG. 5) as mentioned below is obtained based on a standard engine or an average engine is used for the engine model 30f.

Figure 3:
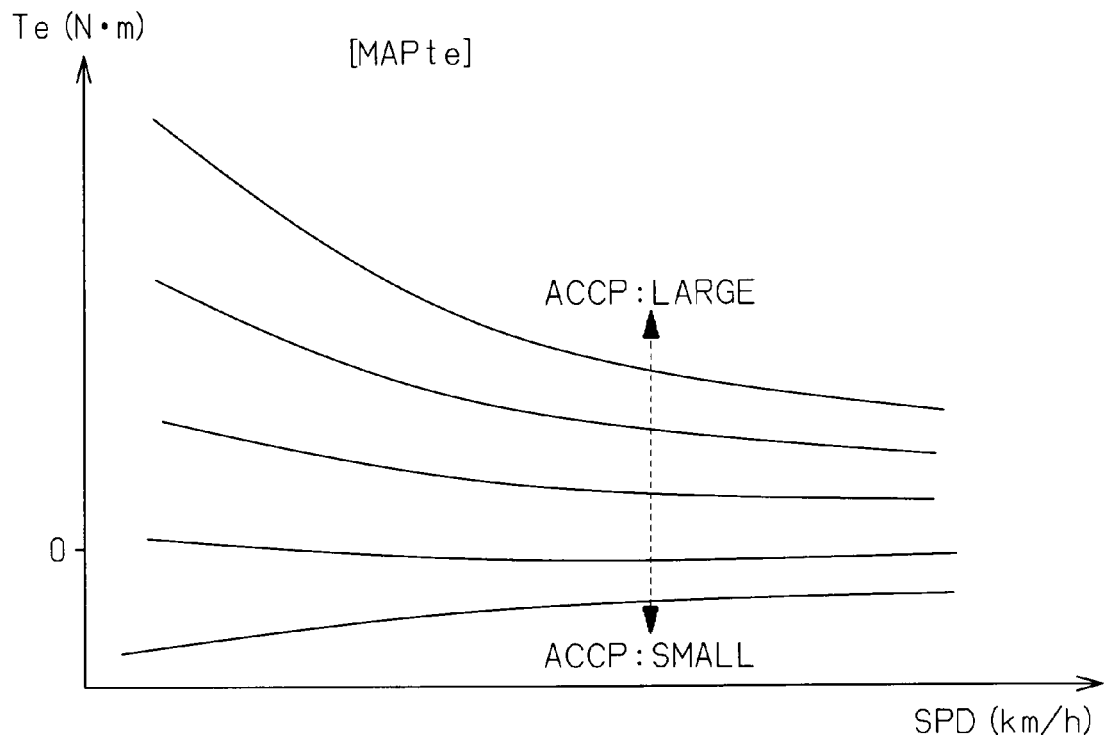
FIG. 3 is an explanatory view of a map MAPte for calculating a target engine torque Te.

The target engine torque calculation section 30c is a portion which is arrived at based on a model generated during designing of output performance for the gasoline engine 2. For example, the target engine torque calculation section 30c represents a relation among the vehicle speed SPD, the accelerator operation amount ACCP and the target engine torque Te, as illustrated in FIG. 3.

The torque converter model 30d represents a relation among input side and output side input torques obtained based on the standard torque converter or the average torque converter, the input rotational speed, the output torque and the output rotational speed. If any two of the input torque, the input rotational speed, the output torque and the output rotational speed are determined, the other two values are uniquely determined as well. Accordingly, when the target engine torque Te and the turbine rotational speed NT are determined, the target model rotational speed NEm is uniquely determined.

Figure 4:
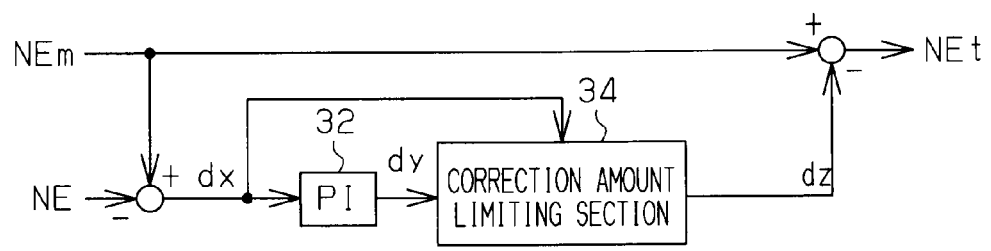
FIG. 4 is a control block diagram illustrating a target rotational speed adjustment section.

The target rotational speed adjustment section 30e performs the process as illustrated in a control block diagram in FIG. 4. Specifically, the target rotational speed NEt is calculated by setting the target model rotational speed NEm as an initial value for the target rotational speed NEt and correcting the target rotational speed NEm based on a difference between the target model rotational speed NEm and the actual rotational speed NE. In this case, a control correction amount dy is calculated by executing a PI control calculation for the difference dx between the target model rotational speed NEm and the actual rotational speed NE at a PI control calculation section 32. Further, the control correction amount dy is limited at a correction amount limiting section 34 to determine final correction amount dz. In this embodiment, the control correction amount dy is limited to be equal or smaller than the difference dx between the target model rotational speed NEm and the actual rotational speed NE. Then, the target rotational speed NEt is calculated by correcting the target model rotational speed NEm by the final correction amount dz. The target rotational speed adjustment process is described in detail below.

Figure 5:
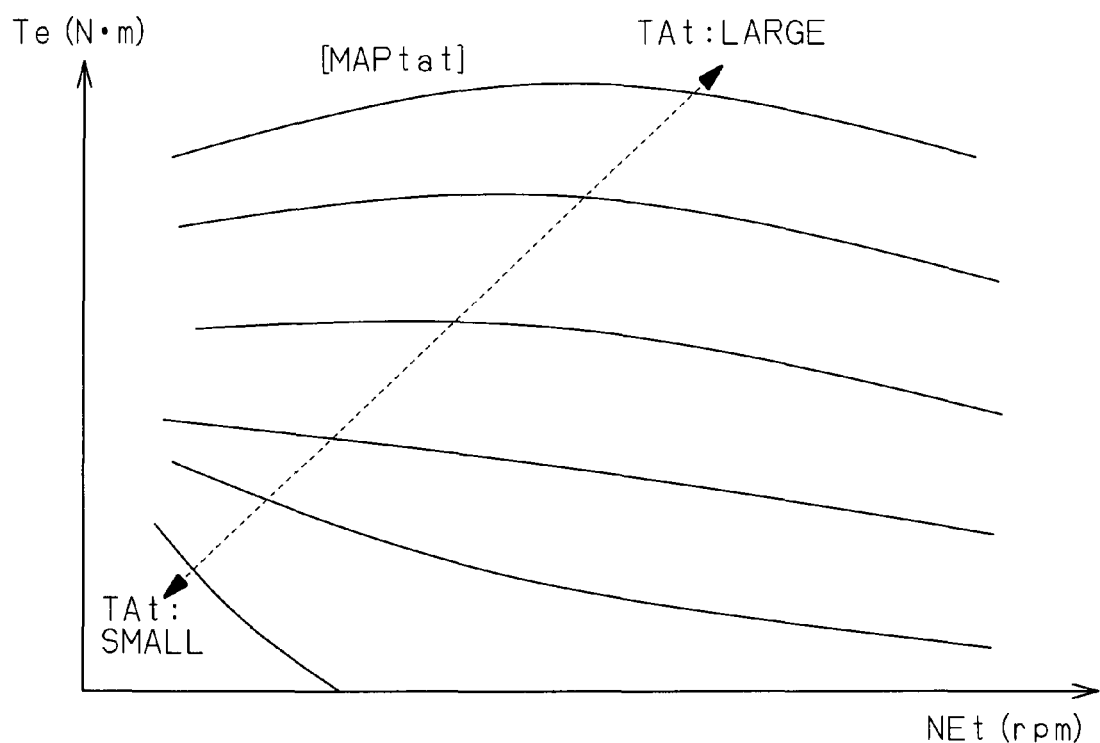
FIG. 5 is an explanatory view of a map MAPtat for calculating a target throttle opening degree TAt.

The engine model 30f includes a map MAPtat for determining the target throttle opening degree TAt by using the target rotational speed NEt and the target engine torque Te as parameters, as illustrated in FIG. 5. The map MAPtat represents a relation in a steady state among the rotational speed, the engine torque and the throttle opening degree which are obtained from experiment with regard to the standard engine or the average engine.

Figure 6:
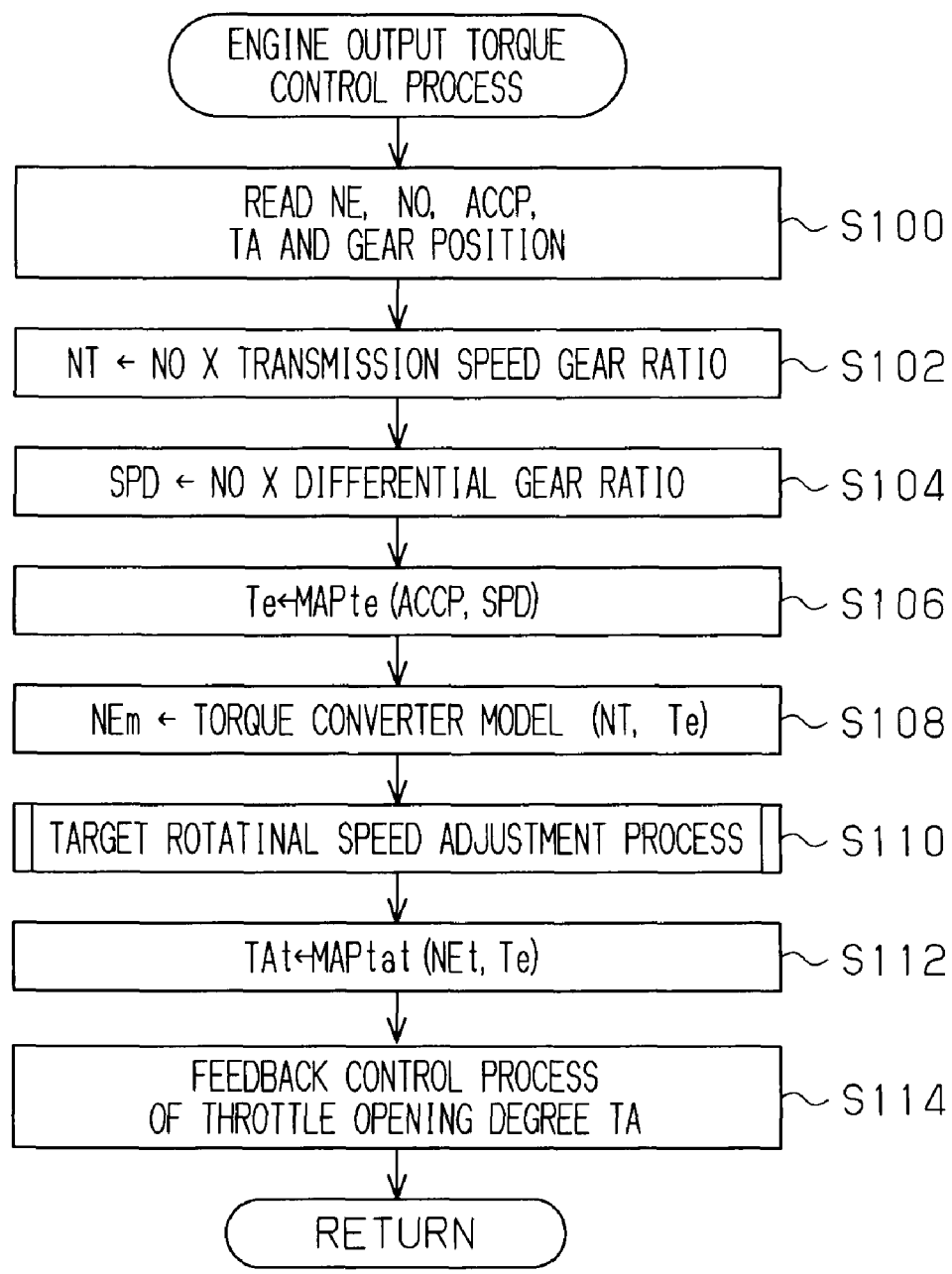
FIG. 6 is a flow chart of an engine output torque control process.

FIG. 6 illustrates a flow chart performing the process of the control block diagram as mentioned above as a computer process. The present process is performed, for example, as interrupt processing per 50 ms.

When the process starts, the actual rotational speed NE, the output side rotational speed NO, the accelerator operation amount ACCP, the throttle opening degree TA and the transmission gear position which have been already obtained from the respective sensors 20, 22, 26 and 16b and the transmission control apparatus are read into a working memory within the engine output torque control device 18 (S100).

Next, the turbine rotational speed NT is calculated by Formula 1 (S102)

$$NT \leftarrow NO \times \text{transmission gear ratio} \quad [1]$$

Then, the vehicle speed SPD is calculated by Formula 2 (S104).

$$SPD \leftarrow NO \times \text{differential gear ratio} \quad [2]$$

This calculation may not be performed and, instead, the value of the vehicle speed SPD may be calculated by another vehicle control system independently.

Next, the target engine torque Te is calculated based on the accelerator operation amount ACCP and the vehicle speed SPD in accordance with the map MAPte illustrated in FIG. 3 (S106). Then, as described above, the target model rotational speed NEm is calculated based on the turbine rotational speed NT and the target engine torque Te in accordance with the torque converter model (S108).

Figure 7:
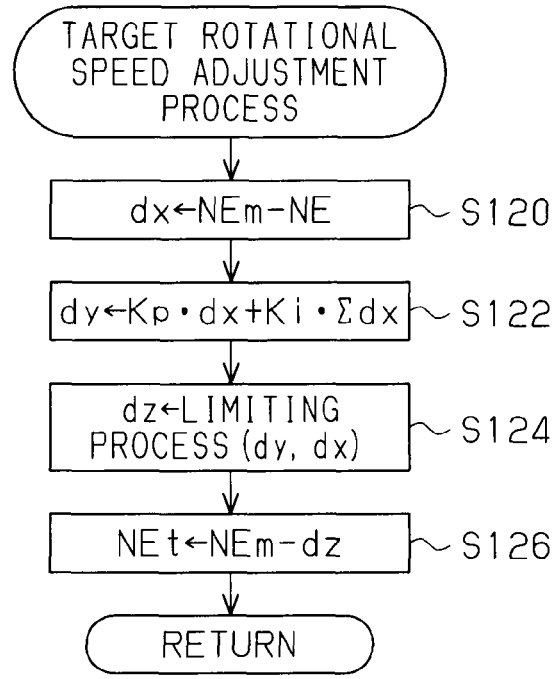
FIG. 7 is a flow chart of a target rotational speed adjustment process.

Next, a target rotational speed adjustment process (S110) is performed to calculate the target rotational speed NEt. The target rotational speed adjustment process (S110) carries out a process as illustrated in FIG. 7 corresponding to FIG. 4. Specifically, the difference dx between the target model rotational speed NEm and the actual rotational speed NE is calculated by Formula 3 (S120).

$$dx \leftarrow NEm-NE \quad [3]$$

The PI control calculation is performed as expressed in Formula 4 by using the difference dx (S122).

$$dy \leftarrow Kp \cdot dx + Ki \cdot \Sigma dx \quad [4]$$

wherein Kp and Ki are proportion coefficients and $\Sigma dx$ is an integral of the difference dx per control cycle.

Then, the limiting process is carries out (S124). In the limiting process, the value of the control correction amount dy determined as mentioned above is set to the final correction amount dz while setting the difference dx as a limit value (S124). In other words, if the control correction amount dy is greater than zero (0) and dy>dx is satisfied, the difference dx is set to the value of the final correction amount dz. If the control correction amount dy is greater smaller than zero (0) and dy<dx is satisfied, the value of the difference dx is set to the final correction amount dz. In the other cases, the control correction amount dy is set to the final correction amount dz. The target model rotational speed NEm is corrected to the target rotational speed Net by the final correction amount dz as calculated above, as expressed in Formula 5 (S126).

$$NEt \leftarrow NEm-dz \quad [5]$$

Figure 8:
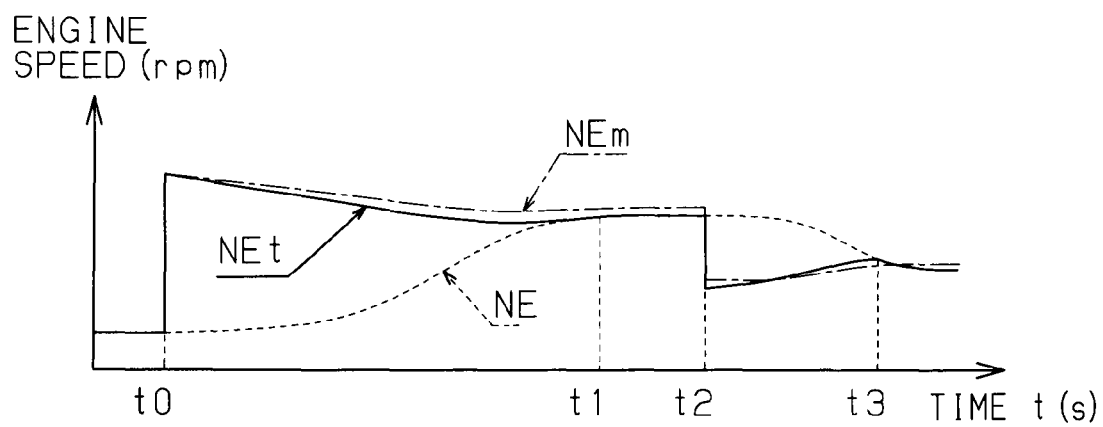
FIG. 8 is a timing chart showing a control example of the first embodiment.

FIG. 8 is a timing chart illustrating an example of the control in the first embodiment. In the timing chart, When the driver depresses the accelerator pedal 24 (t=t0), the target engine torque Te is rapidly increased (S106). The target model rotational speed NEm is also rapidly increased accordingly (S108). The actual rotational speed NE is increased in a delayed manner due to the long dead time. The value of the model rotational speed NEm is corrected in such a manner as to gradually approach the actual rotational speed NE to set the target rotational speed NEt while setting the difference dx between the target model rotational speed NEm and the actual rotational speed NE (FIG. 7, t≧t0) as the limit for the correction. Accordingly, the target rotational speed NEt finally approaches the actual rotational speed NE and coincides with the actual rotational speed NE (t≧t1).

When, the driver returns the accelerator pedal 24 (t=t2), the target engine torque Te is rapidly decreased (S106). The target model rotational speed NEm is also rapidly decreased accordingly (S108). The actual rotational speed NE is decreased in a delayed manner due to the long dead time. The value of the model rotational speed NEm is corrected in such a manner as to gradually approach the actual rotational speed NE while setting the difference dx as the limit for correction and set the corrected model rotational speed NEm as the target rotational speed NEt (FIG. 7, t≧t2). Accordingly, the target rotational speed NEt finally approaches the actual rotational speed NE and coincides with the actual rotational speed NE (t≧t3).

In accordance with the first embodiment, the vehicle speed calculation section 30b, the target engine torque calculation section 30c, the torque converter model 30d and the target rotational speed adjustment section 30e corresponds to the target rotational speed calculation section. The vehicle speed calculation section 30b and the target engine torque calculation section 30c corresponds to the target drive force setting section. The engine model 30f corresponds to the control amount calculation section. The output side rotational speed detection section corresponds to the turbine rotational speed calculation section 30a. The torque converter model 30d corresponds to the target model rotational speed calculation section. The engine rotational speed sensor 20 corresponds to the rotational drive force source rotational speed detection section. The rotational output sensor 22 corresponds to the transmission output shaft rotational speed detection section.

In the engine output torque control process (FIG. 6), the steps S100 to S110 correspond to the process of the target rotational speed calculation section. The steps S104 and S106 correspond to the process of the target drive force setting section. The step S112 corresponds to the process of the control amount calculation section. Further, the step S108 corresponds to the process of the target model rotational speed calculation section. The step S110 (FIG. 7: the target rotational speed adjustment process) corresponds to the process of the target rotational speed adjustment section.

The first embodiment has the following advantage.

(1) In the target rotational speed adjustment process (FIG. 7) performed by the target rotational speed adjustment section, the target rotational speed NEt is calculated by correcting the value of the target model rotational speed NEm to gradually approach the actual rotational speed NE.

The initial value of the control amount (or the target rotational speed NEt used for calculating the target throttle opening degree Tat) is the target model rotational speed NEm. That is, the actual rotational speed NE itself having the long dead time is not used for the target rotational speed NEt from the beginning, hunting is not generated during control of the drive force (the engine output torque in this case) of the gasoline engine 2 even if the target throttle opening degree TAt is calculated based on the target rotational speed NEt.

The correction is carried out in such a manner as to gradually approach the target rotational speed NEt to the actual rotational speed NE in accordance with the PI control calculation.

Then the target rotational speed NEt finally converges on the actual rotational speed NE. The relation represented with respect to the rotational drive force source model (the engine model 30f) and the rotational drive force source output transmission model (the torque converter model 30d) is a standard or average relation and a deviation may exist between the target model rotational speed NEm and the actual rotational speed NE in a steady state. However, the target rotational speed NEt converges with the actual rotational speed NE to become a target rotational speed reflecting to the actual relation. Accordingly, the target rotational speed NEt becomes the target rotational speed which complies with each actual gasoline engine 2 at a high precision.

In the engine output torque control device 18, or the rotational drive force source control apparatus, hunting of the engine during control is prevented and the deviation between the actual rotational speed NE and the target rotational speed Net is reduced or prevented. The gasoline engine 2 for the vehicle controlled as mentioned above can provide for smooth vehicle travel.

Figure 9:
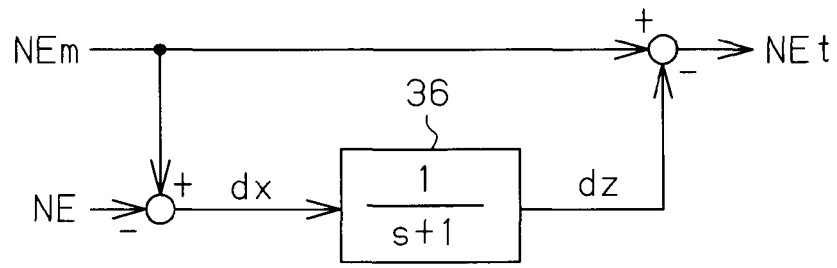
FIG. 9 is a control block diagram illustrating a target rotational speed adjustment section in accordance with a second embodiment.
Figure 10:
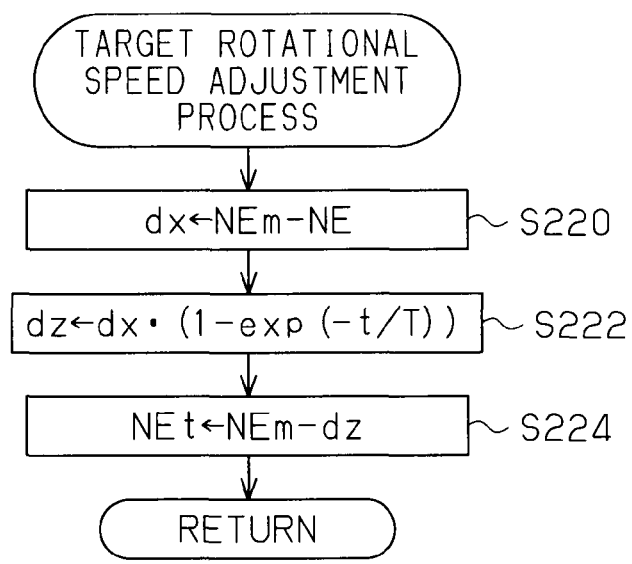
FIG. 10 is a flow chart of a target rotational speed adjustment process.

In the second embodiment, the target rotational speed adjustment section 30e as illustrated in FIG. 2 performs a process as illustrated in a control block diagram of FIG. 9, instead of FIG. 4. FIG. 9 is the same as FIG. 4 in that the initial value of the target rotational speed NEt is the target model rotational speed NEm and the target model rotational speed NEm is corrected based on the difference dx between the target model rotational speed NEm and the actual rotational speed NE to calculate the target rotational speed NEt. However, in FIG. 9, the final correction amount dz is calculated by executing a first order lag process of the difference dz by a first order lag processing section 36. Then, the target model rotational speed NEm is corrected based on the final correction amount dz to calculate the target rotational speed NEt. Accordingly, a process illustrated in FIG. 10 is performed as the target rotational speed adjustment process instead of FIG. 7. Since the other structures are the same as those in the first embodiment, a description will be given of the other structures with reference to FIGS. 1 to 3, 5 and 6.

In the target rotational speed adjustment process (FIG. 10), a correction is performed so as to approach the target rotational speed NEt to the actual rotational speed NE gradually by using the first order lag process. That is, as expressed in the Formula 3 as mentioned above, the difference dx between the target model rotational speed NEm and the actual rotational speed NE is calculated (S220).

Then, the final correction amount dz is calculated in accordance with the first order lag processing as expressed by Formula 6 by using the difference dx (S222).

$$dz \leftarrow dx \cdot (1 - \exp(-t/T)) \quad [6]$$

wherein (1−exp(−t/T)) is a first order lag system, T is a time constant, and is an elapsed time from a rapid change time, such as a stepped change, of the target model rotational speed NEm caused by a change in an acceleration opening degree ACCP or the like. The time constant T is set in such a manner that the resulting final correction amount dz gradually changes the target rotational speed NEt from the target model rotational speed NEm side to the actual rotational speed NE side.

The value of the target model rotational speed NEm is corrected by the final correction amount dz as calculated above to obtain the target rotational speed NEt, as expressed in the Formula 5 (S224).

Figure 11:
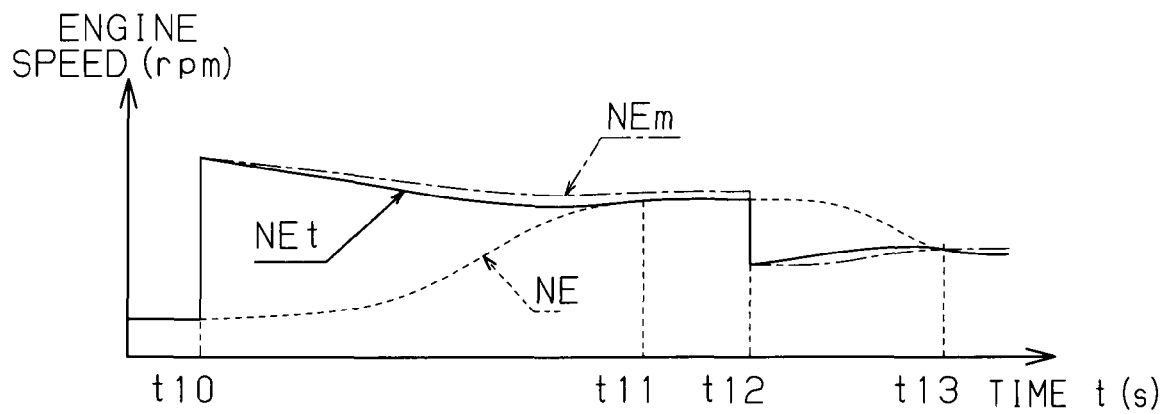
FIG. 11 is a timing chart showing a control example of the second embodiment.

FIG. 11 is a timing chart showing an example of a control in the second embodiment. When the driver depresses the accelerator pedal 24 (T=t10), the target engine torque Te is rapidly increased (S106). Accordingly, the target model rotational speed NEm is also rapidly increased (S108). The actual rotational speed NE is increased in a delayed manner due to the long dead time. The value of the target model rotational speed NEm corrected by the final correction amount dz calculated by the first order lag process (S222) is set to the target rotational speed NEt in such a manner that the target model rotational speed NEm gradually approaches the actual rotational speed NE (FIG. 10, t≧t10). Therefore, the target rotational speed NEt finally comes close to the actual rotational speed NE, and coincides with the actual rotational speed NE (t≧t11).

When the driver returns the accelerator pedal 24 (t=t12), the target engine torque Te is rapidly decreased (S106). The target model rotational speed NEm is also rapidly decreased accordingly (S108). The actual rotational speed NE is decreased in a delayed manner due to the long dead time. The value of the target model rotational speed NEm is corrected by the final correction amount dz as mentioned above in such a manner as to approach to the actual rotational speed NE and the corrected model rotational speed NEm as the target rotational speed NEt (FIG. 10, t≧t12). Therefore, the target rotational speed NEt finally approaches the actual rotational speed NE and coincides with the actual rotational speed NE (t≧t13).

In the second embodiment, a step S110 (FIG. 10: target rotational speed adjustment process) corresponds to the process of the target rotational speed adjustment section.

The second embodiment has a following advantage.

(1) Instead of the PI control calculation, the first order lag process is performed. However, the same effect as that of the first embodiment may be caused. That is, hunting during control is prevented and the deviation between the actual rotational speed NE and the target rotational speed Net is reduced or prevented.

Figure 12:
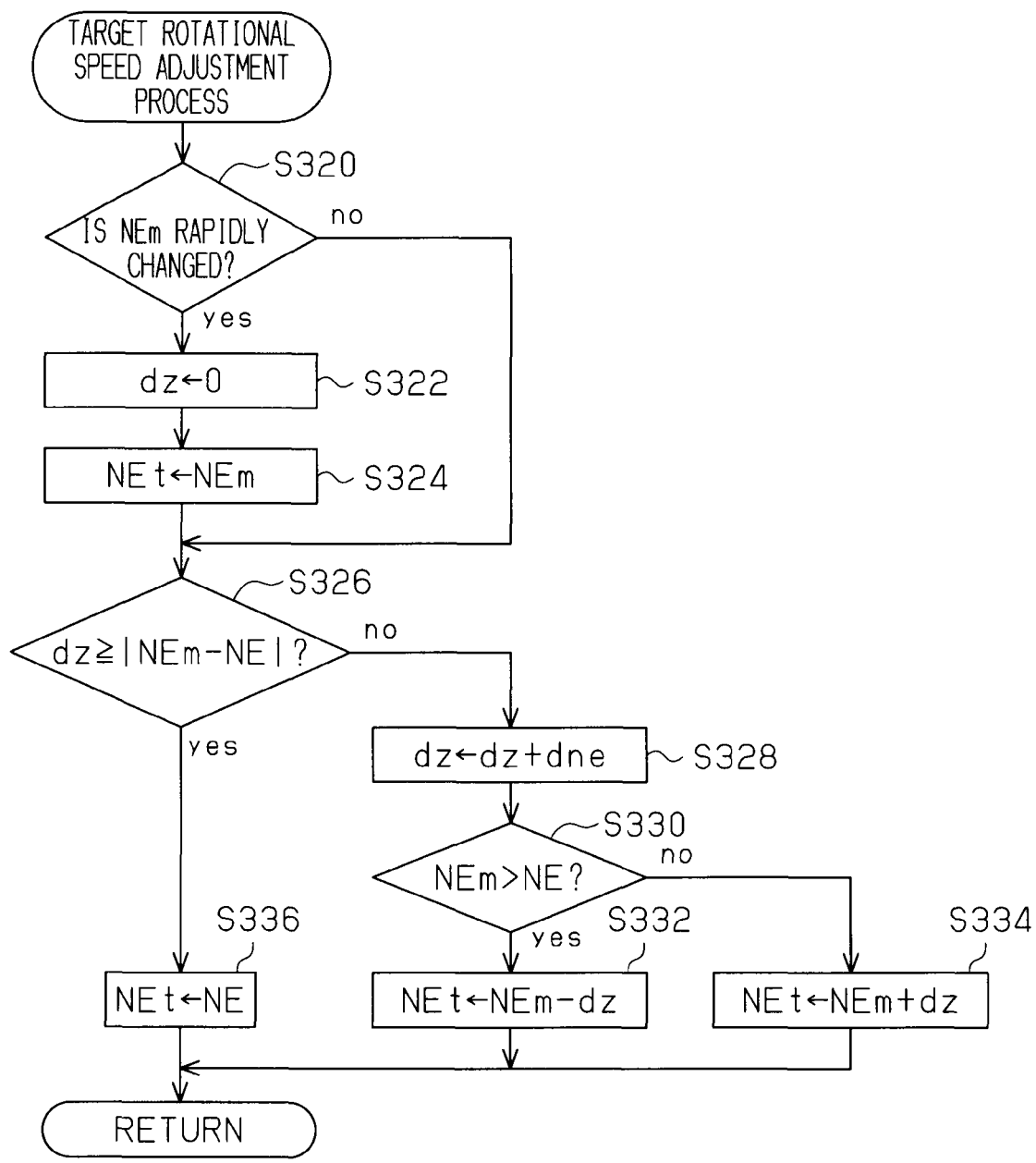
FIG. 12 is a flow chart of a target rotational speed adjustment process in accordance with a third embodiment.

In the third embodiment, a target rotational speed adjustment process as illustrated in FIG. 12 is performed instead of the process of the target rotational speed adjustment section 30e of FIG. 7 in the first embodiment. In the target rotational speed adjustment process (FIG. 12), when the target model rotational speed NEm is rapidly changed, the target rotational speed NEt is changed from the target model rotational speed NEm toward the actual rotational speed NE in a repetitive way by increments of a fixed rotational speed. Since the other structures are the same as those in the first embodiment, a description will be given of the other structures with reference to FIGS. 1 to 3, 5 and 6.

If the target rotational speed adjustment process (FIG. 12) is performed, it is firstly determined whether or not the target model rotational speed NEm is rapidly changed (S320). The rapid change in the target model rotational speed NEm is determined based on a magnitude of the change amount of the target model rotational speed NEm per unit time. For example, an absolute value of the change amount is larger than the reference value, the determination is affirmative. Thus, such a rapid change in the target model rotational speed NEm is determined that the great difference is generated between the actual rotational speed NE and the target model rotational speed NEm.

Next, if the target model rotational speed NEm is rapidly changed (yes in S320), the final correction amount dz is cleared (S322). Then the target model rotational speed NEm is set to the target rotational speed NEt (S324).

Next, it is determined whether or not the final correction amount dz is equal to or more than the absolute value (|NEm−NE|) of the difference between the target model rotational speed NEm and the actual rotational speed NE (S326). Since a relation dz<|NEm−NE| is satisfied (no in S326) at the beginning of the rapid change in the target model rotational speed NEm, the final correction amount dz is increased by a gradual incremental amount dne as expressed in Formula 7 (S328).

$$dz \leftarrow dz + dne \quad [7]$$

The value of the gradual incremental amount dne is, for example, several rpm to ten and several rpm.

Next, it is determined whether or not the target model rotational speed NEm is greater than the actual rotational speed NE (S330). If the relation NEm>NE is satisfied (yes in S330), the target rotational speed NEt is set by subtracting the final correction amount dz from the target model rotational speed NEm as expressed in Formula 8 (S332).

$$NEt \leftarrow NEm - dz \quad [8]$$

Meanwhile, if the relation NEm>NE is not satisfied (no in S330), the target rotational speed NEt is set by adding the final correction amount dz to the target model rotational speed NEm as expressed in Formula 9 (S334).

$$NEt \leftarrow NEm + dz \quad [9]$$

If the step S332 or the step S334 is finished, the step temporarily exits the target rotational speed adjustment process.

If the rapid change in the target model rotational speed NEm is finished in the next control cycle (no in S320), it is then determined whether or not the relation dz≧|NEm−NE| is satisfied (S326). If the state dz<|NEm−NE| is maintained (no in S326), the process of the Formula 7 is performed in the step S328 as mentioned above to increase the final correction amount dz by the gradual incremental amount dne. Then the step S332 or the step S334 is performed in accordance with whether or not the relation NEm>NE is satisfied (S330).

Subsequently, negative determination is made in the step S320, negative determination is made in the step S326, the gradual increase in the final correction amount dz is performed in the step S328, and the setting of the target rotational speed NEt in the step S332 or the step S334 are carried out repeatedly. Accordingly, the target rotational speed NEt is gradually changed from the target model rotational speed NEm to the actual rotational speed NE.

Then, if the changes in the target model rotational speed NEm and the actual rotational speed NE are generated and the relation dz≧|NEm−NE| is finally satisfied (yes in S326), the value of the actual rotational speed NE is set as the target rotational speed NEt (S336).

Subsequently, if the rapid change in the target model rotational speed NEm is not generated (no in S320), and the target model rotational speed NEm and the actual rotational speed NE are stable (yes in S326), the actual rotational speed NE is kept as the target rotational speed Net (S336).

The same control as the timing chart of FIG. 11 performed by the process mentioned above.

In the third embodiment, the step S110 (FIG. 12) corresponds to the process of the target rotational speed adjustment section.

The third embodiment has a following advantage.

(1) Instead of the PI control calculation, the target rotational speed NEt is gradually changed by increments of the fixed rotational speed from the target model rotational speed NEm to the actual rotational speed NE. In accordance with this structure, the same effect as that of the first embodiment may be caused. That is, hunting of the engine during control is prevented and the deviation between the actual rotational speed NE and the target rotational speed Net is reduced or prevented.

The above embodiments may be modified as follows.

In the first embodiment mentioned above, the control correction amount dy is continuously determined in accordance with the PI control calculation during the activation of the engine output torque control device 18. However, alternatively, the PI control calculation may be started from a state in which the control correction amount dy is cleared, by initializing the target rotational speed NEt to the target model rotational speed NEm, at a time when the target model rotational speed NEm is rapidly changed.

In the third embodiment, the time of the rapid change in the target model rotational speed NEm is determined based on the stepped change in the target model rotational speed NEm or the change amount per unit time. However, alternatively, it is possible to set the time at which the target model rotational speed NEm separates from or intersects the actual rotational speed NE as illustrated by timings t0, t2, t10 and t12 in FIGS. 8 and 11 to the rapid change time in the target model rotational speed NEm.

Instead of the PI control calculation performed in the first embodiment, an I control calculation may be performed. That is, the control correction amount dy may be calculated based on "Ki·Σdx" only in the calculation of the Formula 4 in the step S122 during the target rotational speed regulating process (FIG. 7).

In the third embodiment, the target rotational speed NEt changes from the target model rotational speed NEm to the actual rotational speed NE by increments of the fixed rotational speed. However, the target rotational speed NEt may change by increments of a fixed rate of the difference dx.

While the source of rotational drive force is a gasoline engine in the above embodiments, a diesel engine may be used instead. In that case, the control amount is a fuel injection amount.

Other than the above-described internal combustion engine, an electric motor such as a fuel cell vehicle or a hybrid engine with an internal combustion engine and an electric motor may be used.

The present invention is also applicable to a source of rotational drive force in which the source includes a manual clutch or other clutches lacking a torque converter in the output transmission system for a rotational drive force source.

What is claimed is:

1. A control apparatus for controlling a source of a rotational drive force based on a target rotational speed, the control apparatus comprising:
    a target model rotational speed calculation section for calculating a rotational speed corresponding to a target drive force of the source as a target model rotational speed;
    an actual rotational speed detection section for detecting an actual rotational speed of the source; and
    a target rotational speed adjustment section for setting the target rotational speed by correcting a value of the target model rotational speed calculated by the target model rotational speed calculation section to gradually approach the actual rotational speed detected by the actual rotational speed detection section.

2. A control apparatus of claim 1, wherein the source is a rotational drive force source for a vehicle.

3. A control apparatus of claim 1, wherein the source of rotational drive force is an internal combustion engine, an electric motor, or a hybrid engine using both the internal combustion engine and the electric motor.

4. A control apparatus of claim 1, wherein the target drive force of the source is a target engine torque.

5. A control apparatus of claim 1, wherein the target rotational speed adjustment section performs the correction based on a correction amount, wherein the correction amount is determined in accordance with a PI control calculation or an I control calculation while setting a difference between the target model rotational speed (NEm) and the actual rotational speed as a limit value.

6. A control apparatus of claim 1, wherein the target rotational speed adjustment section performs the correction based on a first order lag process of a difference between the target model rotational speed and the actual rotational speed.

7. A control apparatus of claim 1, wherein the target rotational speed adjustment section, wherein the correction amount gradually increases while setting a difference between the target model rotational speed (NEm) and the actual rotational speed as a limit value.

8. A control apparatus of claim 1, wherein the source includes an internal combustion engine and the control amount for controlling the source is a throttle opening degree or a fuel injection amount.

9. A control apparatus of claim 1, wherein the target rotational speed adjustment section cancels the correction and initializes a value of the target rotational speed to a value of the target model rotational speed, when the target model rotational speed is rapidly changed.

10. A control apparatus of claim 9, wherein the time when the target model rotational speed is rapidly changed is when an absolute value of a change amount of the target model rotational speed per unit time becomes larger than a reference value.

11. A control apparatus of claim 9, wherein the time when the target model rotational speed is rapidly changed is when the target model rotational speed separates from or intersects the actual rotational speed.

12. A control apparatus for controlling a source of a rotational drive force, the control apparatus comprising:
a target rotational speed calculation section for calculating a target rotational speed of the source of the rotational drive force;
a target drive force setting section for setting a target drive force generated by the source; and
a control amount calculation section for calculating a control amount of the source based on the target rotational speed calculated by the target rotational speed calculation section and the target drive force set by the target drive force setting section, by using a predetermined rotational drive force model for the source,
wherein the target rotational speed calculation section includes:
a target model rotational speed calculation section for calculating a rotational speed corresponding to the target drive force as a target model rotational speed based on the target drive force set by the target drive force setting section, by using a predetermined rotational drive force source output transmission model of the source;
an actual rotational speed detection section for detecting an actual rotational speed of the source; and
a target rotational speed adjustment section for setting the target rotational speed by correcting a value of the target model rotational speed calculated by the target model rotational speed calculation section to gradually approach the actual rotational speed detected by the actual rotational speed detection section.

13. A control apparatus of claim 12, wherein a rotational drive force of the source is transmitted by an output transmission system, wherein the output transmission system include a torque converter, wherein the output transmission model reflects a state of the torque converter.

14. A control apparatus of claim 13, further comprising an output side rotational speed detection section for detecting an output side rotational speed on an output side of the torque converter,
wherein the target model rotational speed calculation section calculates the target model rotational speed based on the output side rotational speed detected by the output side rotational speed detection section and the target drive force set by the target drive force setting section, by using a torque converter model as the output transmission model.

15. A control apparatus of claim 14, wherein a rotational drive force of the source is transmitted by the output transmission system, wherein the output transmission system includes a transmission arranged on an output side of the torque converter and an output shaft rotational speed detection section for detecting an output shaft rotational speed of the transmission, wherein the output side rotational speed detection section calculates the output side rotational speed based on the output shaft rotational speed detected by the output shaft rotational speed detection section and a gear ratio of the transmission.

* * * * *